Sept. 1, 1942.　　　　L. E. TRABBIC　　　　2,294,816
SOLDERING TIP
Filed April 1, 1941
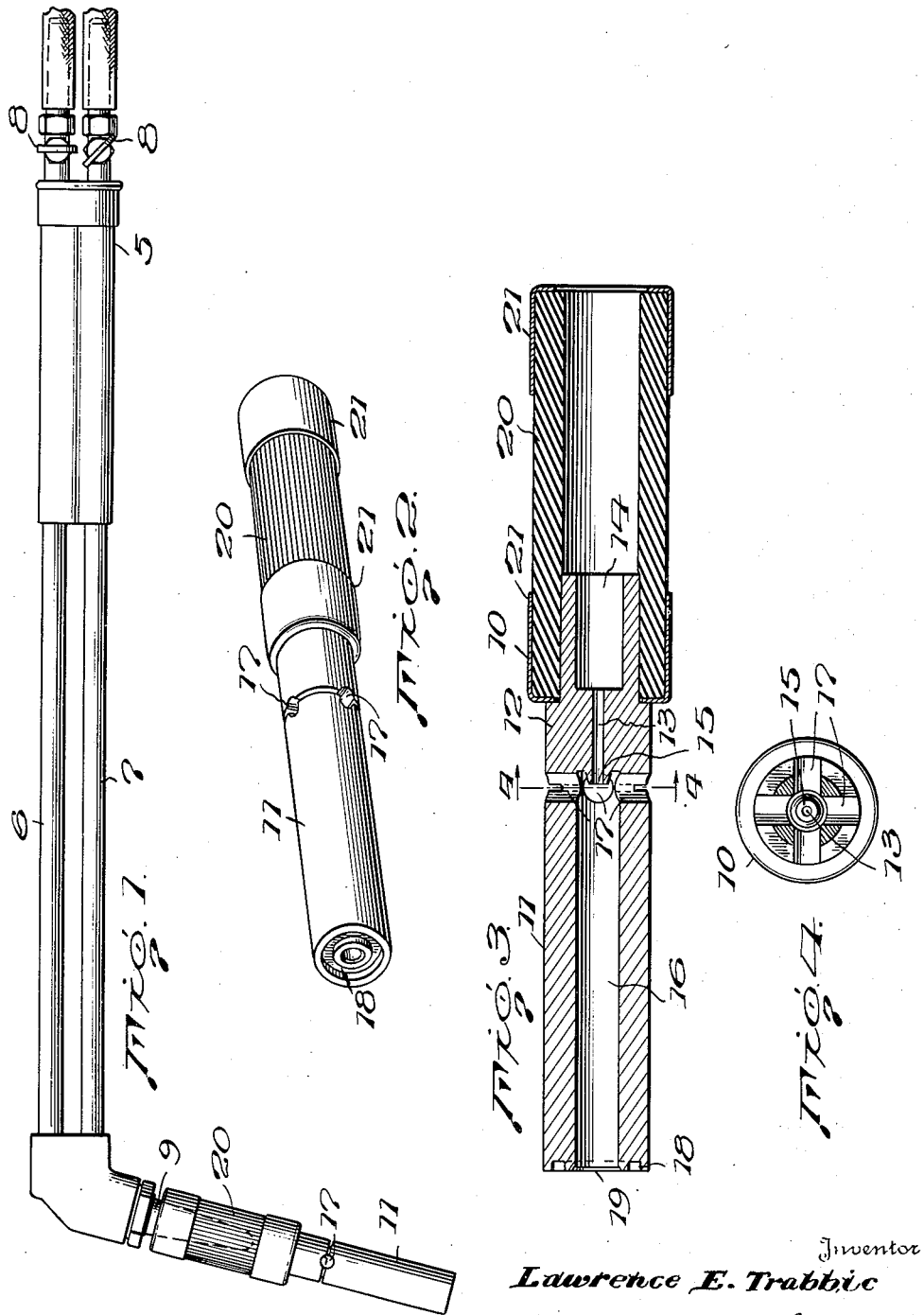
Inventor
Lawrence E. Trabbic
By Bernard Z. Harvey
Attorney Patented Sept. 1, 1942

2,294,816

UNITED STATES PATENT OFFICE 2,294,816

SOLDERING TIP

Lawrence E. Trabbic, Toledo, Ohio

Application April 1, 1941, Serial No. 386,355

7 Claims. (Cl. 158—27.4)

The device of the present invention consists of a soldering tip which is constructed to permit expeditious application of the tip to and removal of the same from a welding torch of standard construction.

From experiment I have learned that a welding torch of conventional design, embodying the usual gas and oxygen tubes may be employed to coact with a simple and inexpensive tip, of especial design, to permit use of the torch in soldering operations. It is therefore one of the objects of this invention to provide a tip applicable to a welding torch for use in soldering, especially where a large area is to be covered such as in repairs of turret-top automobiles, the tip being constructed to effect ideal admixture of gas and air, without use of the oxygen of the welding torch, producing the desired blue flame with a complete absence of carbon.

This tip, commercially known as "Slip-on soldering tip" is made of a suitable hard metal, except for the fitting which is of an elastic material to permit it to be flexed into engagement with and out of engagement from the torch nozzle, with a complete absence of screw threads or securing means of any kind.

Various other objects of this invention will be apparent from the following description of the present preferred form of the invention taken in connection with the accompanying drawing, wherein Fig. 1 is an elevational view of a soldering tip constructed in accordance with the present invention, illustrating its application;

Fig. 2 is a perspective view of the tip;

Fig. 3 is a longitudinal sectional view thereof; and

Fig. 4 is a cross-sectional view, taken through the air inlet openings of the tip, on the line 4—4 of Fig. 3.

For the purpose of illustrating the application of my invention, a portion of a welding torch 5 is shown, this being of standard construction and including oxygen and gas tubes 6 and 7 respectively, which tubes are controlled by independent valves 8. The outlet or working end of the torch is equipped with the usual nozzle 9 which tapers to provide a reduced outer terminal.

The tip constructed in accordance with my invention is generally designated 10, consisting of a barrel 11 made of hard metal such as brass, an intermediate part 12 thereof being solid except for an axial gas passageway 13. The extreme inner terminal of the barrel is reduced and provided with a recess 14 through the inner wall of which one end of the passageway 13 extends, to place said passageway and recess in communication. The opposite end of the passageway 13 extends through a tapered boss 15, which latter issues from the outer wall of the solid intermediate part 12 of the barrel, being concentrically mounted in a bore 16 of the barrel 11. The boss 15 is circumscribed by a series of radial air inlet openings 17, each of which latter terminates at its inner end, in proximity to, but appreciably spaced from, said boss. The outer or working end of the barrel 11 is provided with an annular recess 18 providing two spaced walls at the extreme outer end of the barrel. In addition, by preference, I dish out or bevel the outer terminal of the barrel, as indicated at 19, to provide a tapered flaring mouth communicating with the barrel bore 16.

The reduced end of the barrel is engaged with one end of an elastic fitting 20, the fitting being made of hose rubber or other suitable material, the length of which is considerably in excess of the length of the reduced portion of the inner end of the barrel to provide ample bore space for the reception of the nozzle 9 of welding torch. Preferably the opposite ends of the fitting are equipped with ferrules 21 for an obvious purpose. The fitting 20 will flex sufficiently to permit expeditious engagement of the tip with the nozzle and likewise removal of the tip therefrom, at the same time providing positive engagement between the nozzle and tip in a manner productive of an effective seal.

Various changes may be made in the details of construction, proportion and arrangement of parts within the scope of the claims hereto appended.

What is claimed is:

1. For use on a welding torch, a soldering tip embodying an elastic fitting adapted to be flexed into engagement with and out of engagement from the nozzle of a torch, the tip being provided with a gas passageway therethrough and having air inlet openings communicating with the passageway.

2. In combination with a welding torch having a tapered nozzle, and a soldering tip comprising an elastic fitting slidably engageable with the nozzle, the tip having a gas passageway therethrough in communication with the nozzle, said tip having air inlet openings leading into said passageway.

3. A soldering tip for use on a welding torch comprising a barrel with a bore, a part of which is constricted, a boss issuing from one of the constricted terminals into the barrel bore, the boss having a passageway communicating with the bore of the barrel, the barrel having radial openings surrounding the boss, the openings leading into the bore, and elastic means connecting the barrel to the torch.

4. A soldering tip for welding torches comprising a barrel and elastic fitting the latter being slidably engageable over the working end of the torch, the barrel and fitting having bores in communication with the gas outlet of the torch, the barrel having air inlet openings leading into the barrel bore.

5. In combination with a welding torch including a nozzle with communicating gas and oxygen tubes each of the latter being valved; and a soldering tip slidably engageable with said nozzle, the tip having a gas passageway and air inlet openings leading thereinto, the valve of the oxygen tube being closed to effect admixture of the gas and air only during operation of the tip.

6. A soldering tip for use on a welding torch comprising a metal barrel and an elastic fitting, the latter being slidably engageable with the torch nozzle.

7. A soldering tip for use on a welding torch comprising a barrel with a bore, a part of which is constricted, a boss issuing from one of the constricted terminals into the barrel bore, the boss having a passageway communicating with the bore of the barrel, the wall barrel having openings therethrough and surrounding the boss, the openings leading into the bore, and an elastic tube, one end of which is engaged with one end of the barrel, the opposite end of the tube being slidable over the torch nozzle.

LAWRENCE E. TRABBIC.